May 20, 1941. E. H. YONKERS, JR 2,242,277
SUCTION CLEANER
Filed March 1, 1940
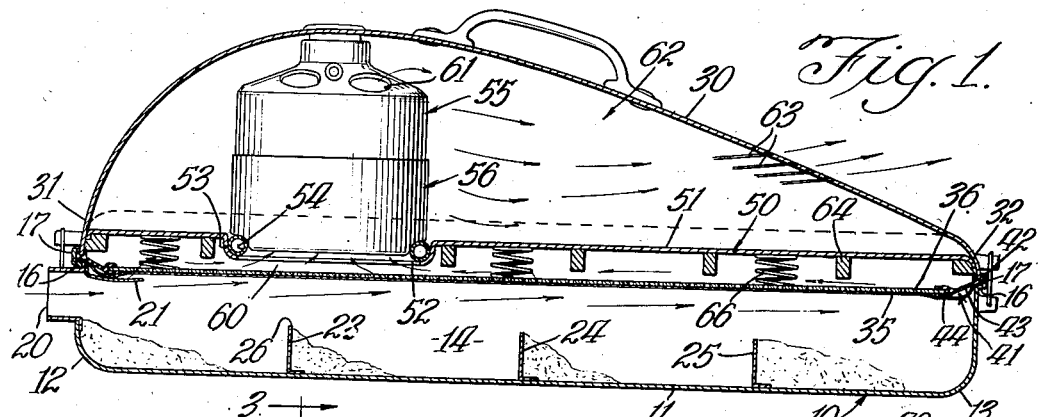
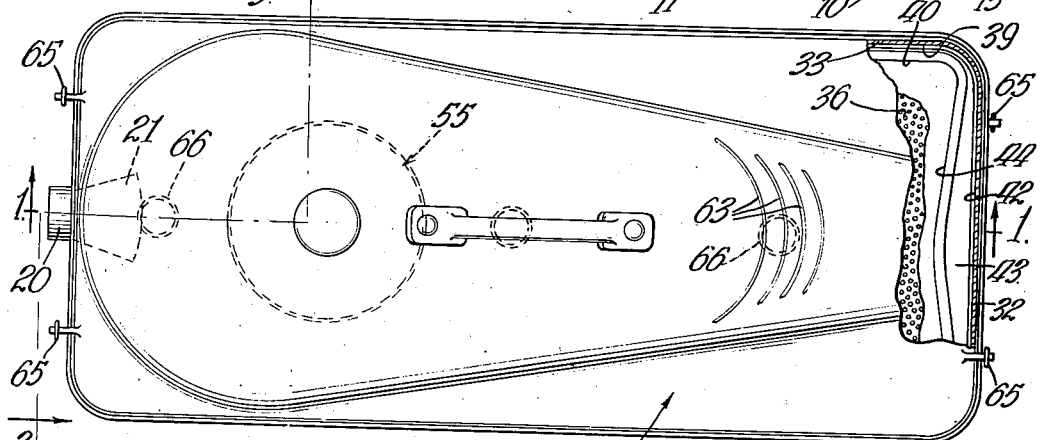
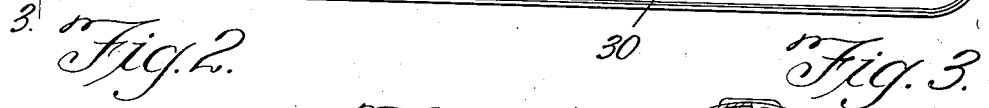
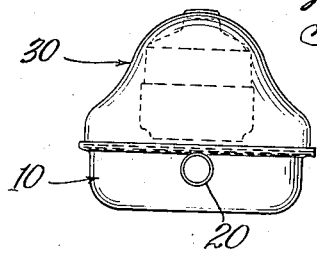
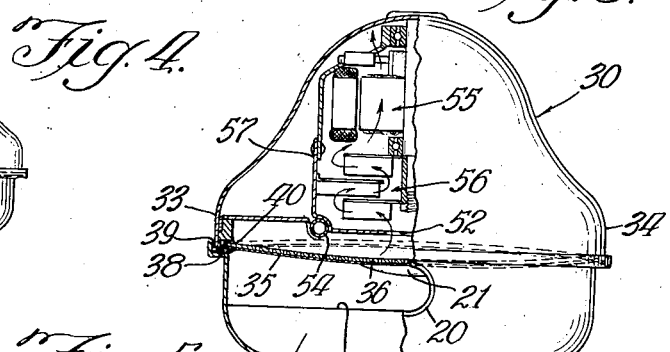
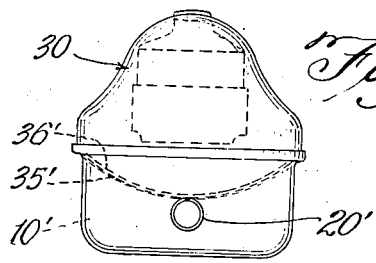

Patented May 20, 1941

2,242,277

UNITED STATES PATENT OFFICE 2,242,277

SUCTION CLEANER

Edward H. Yonkers, Jr., Glencoe, Ill.

Application March 1, 1940, Serial No. 321,681

16 Claims. (Cl. 183—52)

This invention relates to suction cleaners and particularly to a tank-type suction cleaner utilizing a readily removable and replaceable fragile filter such as of paper.

This invention aims to provide a simple and effective suction cleaner construction which will operate at a high level of efficiency. In general, this invention contemplates the use of a fragile, readily replaceable filter element, as of paper, shaped to have linear elements along which a blast of dirt-laden air is directed. The blast of dirt-laden air is relied upon to prevent excessive accumulation of dirt on the filter surface and to this end the blast is discharged contiguous to and along the filter surface.

The filter surface is so shaped that a blast of air discharged contiguous to and substantially parallel with the elements of the surface will travel substantially in a straight line along the filter surface.

The air blast itself expands as it travels from the intake nozzle so that the air travel has some side component. Solid particles, however, travel in a straight line and that portion of the air blast normally containing the bulk of incoming dirt is regarded as the dirt-laden air blast. Thus a substantially flat sheet or a portion of a cylindrical surface are examples of suitable shapes, it being understood that the air travel would be along a straight element of the surface, whether straight, curved or bent.

The dirt-laden air is directed as a high velocity stream right along the high pressure side of the filter surface and exerts a scrubbing action on the filter surface. At the same time, since the path of dirt in the high velocity stream extends substantially parallel to the filter surface, tearing of the filter by impact is hardly possible.

The filter element is backed by a perforated rigid member to prevent collapse under suction conditions and together therewith forms a filter assembly. This assembly is mounted as a portion of a wall for a dust compartment, on the outside of this wall there being a suction generating means. Thus on the dust compartment side of the filter surface, relatively high pressure conditions obtain while on the other side of the filter surface relatively low pressure conditions obtain when there is a substantial flow of air into the dust compartment. It is understood that when the flow of air to the dust compartment is substantially reduced, as for example, if a rug is being operated upon, then the pressure differential across the filter surface drops substantially. However, some differential will always exist and therefore reference will be made to the sides of the filter element as high and low pressure sides.

Any fragile porous medium may be used as the filter element proper. Thus any suitable porous paper may be used. I have found that the paper sold in the trade as "Dextilose" is satisfactory. This is a long fibered unsized paper having a high degree of porosity. Distributed over this paper are fibers extending from the surface and tending to retain dirt and function as a focus for some dirt accumulation. In spite of this, the paper functions effectively.

The paper surface may be treated to bind down these filaments without impairing the porosity. Thus the resulting smooth surface of the paper makes it more difficult for dirt to adhere. The paper may be glossed by calendaring with hot dry rolls. Or viscose or other suitable binder may be applied to the surface in sufficient quantity and at proper viscosity to cement down the filaments without appreciably filling the pores to produce a smooth surfaced porous filter.

Whatever paper is used and however it is treated, there will be some tendency for dirt to adhere to the paper surface on the high pressure side. This tendency operates to reduce in some measure the effectiveness of the paper as a filter. While the cleansing and scrubbing action of the dirt-laden air blast along the filter surface is highly satisfactory, it may be supplemented, if desired, by a novel construction whereby the filter element is flipped or snapped at intervals. By operating on the entire filter surface in this manner any dirt on the paper will be forcibly thrown off. This effect is particularly desirable on certain portions of the filter surface that may be remote from the high velocity incoming air blast and thus may not be as effectively scrubbed as the main portion of the filter surface. Thus the air flow through the paper filter is maintained at a high effective level irrespective of the dirt content of the dust pan, within wide limits.

The snapping of the filter element may be accomplished automatically by variations in pressure differential across the filter, as previously pointed out. Manual or intermittently operating automatic means may also be relied upon.

A simple snapping means involves the maintenance of a normally substantially flat filter assembly in a buckled condition. As is well known, considerable energy may be stored under such conditions and the release of the energy results in a snapping of the buckled member from one stable position to the other stable position.

Referring to the drawing:

Figure 1 is a sectional elevation on line 1—1 of Fig. 2;

Fig. 2 is a plan view of the cleaner;

Fig. 3 is an end view partly in section on line 3—3 of Fig. 2; and

Figs. 4 and 5 are modifications.

Referring to Figs. 1 to 3 inclusive, a dustpan generally designated by numeral 10 has a bottom 11, front and rear walls 12 and 13 respectively and side walls 14 and 15. The pan walls terminate in a peripheral flange 16 and upstanding rim 17. The pan is preferably shallow for its length, although depth is not objectionable. Formed in front wall 12 at the upper central portion thereof is an intake nozzle 20 adapted to guide a blast of dirt-laden air into the dustpan. The dirt-laden air may come to the intake nozzle in the customary manner through a cleaning tool or brush and a pipe system.

Intake 20 is shown as circular in cross-section, although this is not essential, and directs the air blast down the length of the pan. As shown here, the intake is formed quite close to the top of the pan and from the top of the intake, a shield plate 21 extends into the pan for a short distance.

Transversely of the pan are a plurality of separator walls 23 to 25 inclusive whose top edges 26 are about in line with the bottom of intake 20. The location and size of these walls are not critical and their purpose is to create cells in the dustpan where dirt and dust may settle out of the path of the air blast.

Resting on the dustpan is a complete filter and suction generating assembly. This comprises a cover member 30 which may have the lines shown for appearance sake. Cover 30 has front and rear edges 31 and 32 respectively and side edges 33 and 34 all normally inside rim 17 and over flange 16 of the pan in the assembled condition.

A filter assembly including a sheet 35 of porous paper and a perforated backing member 36 is adapted to function as a porous partition between the high pressure region in the dustpan and the low pressure region just above the filter element. Backing member 36 is preferably of material which may be buckled and can spring back and forth. Thus a perforated metal plate will function satisfactorily. In order to displace the greatest surface during snapping, it is preferred to restrain two opposite edges of the backing member 36 and permit the other two edges to move freely. Thus, as shown here, the long sides of the backing member are restrained and the short sides permitted to move. To obtain this action, backing member 36 has a width somewhat greater than would be necessary if it were to remain perfectly flat at all times.

To support backing member 36 on cover 30 and to obtain satisfactory sealing, the side edges 33 and 34 of the cover are provided with a molded rubber gasket 38 having slots 39 and 40 into which the corresponding edges of the cover and backing member may be inserted. Transversely of the cleaner are gaskets 41 of relatively flexible rubber. These gaskets have slots 42 into which the transverse edges 31 and 32 of the cover may be inserted. Gaskets 41 have a flexible bridge portion 43 terminating in a slotted end portion 44 into which the movable transverse edges of backing member 36 may be inserted. As shown here, backing member 36 is somewhat shorter than the length of the cover would warrant so that the transverse edges of the backing member may move up and down as the backing member snaps. Bridge portion 43 of the gasket may taper from a minimum length at the ends thereof to a maximum at the center to accommodate the arc of the edge of backing member 36.

Near the rim of cover 30 is disposed a heavy frame 50. This frame serves to reinforce the cover rim against deformation due to the reaction of buckled backing member 36 on the cover and at the same time serves to support the suction generating means.

Extending from frame 50 is a flat rigid cover plate 51 having a cut-out 52 bordered by a beaded edge 53. A rubber gasket 54 is disposed at beaded edge 53 and supports an electric motor 55 and a two stage air pump 56 built as a unit inside of a housing 57. The suction end of the pump is at cut-out 52 which gives access to a flat region 60 between backing member 36 and cover plate 51. The air from the pump passes through the motor, discharges through vents 61 in the housing into a region 62 in the cover at the rear of the machine and emerges through louvres 63 in the cover. To reinforce cover plate 51 and prevent diaphragm action, a plurality of heavy cross pieces 64 may be provided extending across the frame. Locking clasps 65 are provided to maintain the cover on the dust pan.

To bias the backing member against the normal pressure differential, a plurality of coil springs 66 may be disposed between the backing member and cover plate 51 at various places. It is understood that the cover plate is rigid enough to permit the springs to act on the backing member. In practice the bias is sufficient so that when air is coming into the dust-pan in substantial quantities corresponding to a more or less open intake condition, suction will snap the backing member away from its spring biassed position. This is because the bulk of the air flow resistance is concentrated in the paper filter and results in a maximum pressure differential. As soon as substantial air-flow resistance is created ahead of the filter, as by pressing a cleaning tool against a rug, then the pressure differential is no longer concentrated in the paper filter and the backing member will snap back to its spring biassed position, here shown as the down position.

The paper sheet 35 is preferably large enough so that its edges extend over flange 16 of the dust pan. When installing a clean paper filter, it is only necessary to lay a sheet of paper on the flanges and put the rest of the cleaner in position.

The entire machine is made of suitable materials. Thus the cover and pan may be of aluminum with a cast aluminum frame 50 inside of cover 30. Backing member 26 may be made of steel and cover plate 51 may be of sheet steel.

While the cleaner is shown as having a generally rectangular plan view, it is possible to taper the cleaner toward the rear. Thus when the air blast emerges from intake 20 into the dustpan, it spreads out sideways and quickly loses velocity. Hence the filter surface can become narrower as the rear of the machine is approached.

However, practically all of the filter surface is effective as such even though not above the incoming air blast proper. For this reason a large filter area is desirable and all of it is maintained substantially clean by the frequent snapping of the filter assembly.

As clearly evident, shield 21 is shaped to prevent direct impact of dirt against the paper surface at the region of flexure, particularly when the filter and assembly is in the down position. It is preferred to have the filter surface in the down position about on a line with the top of intake 20. When the filter assembly is snapped up, the distance of the paper surface above the horizontal prolongation of the upper part of intake 20 is small enough so that upon slight expansion of the blast effective scouring of the upper surface still takes place.

It is understood that the snapping means may be eliminated and the filter surface be perfectly flat. Even with the buckling, the curvature is slight and as far as the blast is concerned, the paper is flat lengthwise thereof and substantially flat transversely. As is well known, the degree of curvature due to buckling is a function of the thickness of the metal. If slight buckling is desired, a comparatively heavy backing member may be used.

Referring to Fig. 4, a diagrammatic showing of a suction machine having a plain flat filter surface without buckling and without snapping means is shown. In Fig. 5, a cleaner is shown wherein the filter surface has a curved shape, forming a portion of a cylinder. The backing member 36' and paper 35' extend into pan 10'. Intake 20' discharges the blast along the filter surface.

While the filter assembly has been disclosed as rectangular, it is obvious that circular outlines are possible. In this case, a buckled disc effect resembling the bottom of an oil can may be relied upon.

What is claimed is:

1. A suction cleaner comprising a dust receptacle having an intake for dirt-laden air therein and having a filter assembly forming at least part of one of the walls thereof, said assembly including a rigid perforated backing member and a sheet of porous paper so shaped as to have substantially straight parallel linear elements in one direction, said intake discharging the air blast in said one direction contiguous to and along the surface of said paper, and means for generating a suction to pull air through said paper from said receptacle, whereby dirt particles in said air blast tend to travel in a substantially straight line along the filter surface to scrub the same.

2. A suction cleaner comprising a dust receptacle having an open top and an air intake for dirt-laden air, a filter assembly forming at least a portion of a cover for said receptacle, said assembly including a sheet of porous paper and a perforated rigid backing member to prevent collapse of the paper under suction, said assembly being so shaped as to have substantially straight parallel linear elements in one direction, said intake discharging the air blast in said one direction contiguous to and along the surface of said paper, and means for generating a suction above said filter assembly to pull air through said paper from said receptacle, whereby dirt particles in said air blast tend to travel in a substantially straight line along the filter surface to scrub the same.

3. The cleaner of claim 2 wherein said filter assembly is substantially flat.

4. The filter of claim 2 wherein said filter assembly has a curvilinear shape and is formed as a portion of a cylindrical surface.

5. A suction cleaner comprising a dust receptacle having an intake for dirt-laden air therein and having a substantially flat filter assembly forming at least part of one of the walls thereof, said assembly including a rigid, perforated backing member and a flexible, porous sheet, means for mounting said filter assembly in a buckled condition so that it may snap in or out with respect to the receptacle interior, means for supplying dirt-laden air to said receptacle interior, means for generating a suction to pull air through said sheet, and means for snapping said backing member from one position to another during cleaning operations.

6. A suction cleaner comprising an open-topped dust receptacle having an air intake for dirt-laden air, a filter assembly covering at least part of said receptacle, said assembly having a generally rectangular outline and including a flexible, porous sheet and a rigid, perforated, substantially flat backing member for supporting the sheet against collapse under suction, means for mounting said filter assembly so that the backing member is buckled along one dimension thereof and tends to snap into one or another of two stable positions, means for generating a suction above said filter, and means for snapping said backing member from one position to another during cleaning operations.

7. A suction cleaner comprising an open-topped dust receptacle having an air intake for dirt-laden air, a substantially flat filter assembly covering at least part of said receptacle, said assembly including a sheet of porous paper and a rigid, perforated backing member for supporting the paper against collapse under suction, means for generating a suction above said filter assembly, means for mounting said filter assembly in a buckled condition so that said backing member tends to assume one of two stable positions, means for biasing said filter assembly in one stable position corresponding to one suction pressure condition, and means for snapping said member into the other stable position upon the existence of different suction conditions.

8. A suction cleaner comprising an open-topped dust receptacle having an air intake for dirt-laden air, a substantially flat filter assembly covering said receptacle and including a sheet of porous paper and a rigid, perforated backing member for supporting the paper against collapse under suction, means for generating a suction above said filter assembly, means for mounting said member in a buckled condition so that it may snap into one of two stable positions, said positions corresponding to high and low pressure differentials across said paper, means for biasing said assembly in the position corresponding to a low pressure differential, said backing member normally snapping back and forth during cleaner operation.

9. A suction cleaner comprising an open-topped dust receptacle having an air intake for dirt-laden air, a substantially flat filter assembly covering said receptacle and including a sheet of porous paper and a rigid, perforated backing member for supporting the paper against collapse under suction, said assembly having a generally rectangular outline, means for mounting said backing member so that it is buckled along one dimension thereof and tends to snap into one of two stable positions, flexible gasket means at the sides of said backing member normally moving with buckling of said member, means for generating a suction above said filter assembly and means for snapping said backing member from one position to another during cleaning operations.

10. A suction cleaner comprising an open-topped dust receptacle having an air intake for dirt-laden air, a filter assembly covering at least part of said receptacle, said assembly including a sheet of porous paper and a rigid, perforated, substantially flat, backing member for supporting the paper against collapse under suction pressure, means for generating a suction above said filter assembly, said intake discharging the air adjacent to and along the surface of the paper, means for mounting said member in a buckled condition so that it may snap into one of two stable positions, and means for snapping said member from one position to another during cleaning operations.

11. The cleaner of claim 10 wherein the backing member is normally biased in a down-buckled position and wherein the means for snapping the backing member to an up position is a high suction.

12. The cleaner of claim 10 wherein said filter assembly has a generally rectangular outline with the length of said assembly parallel to the direction of the air blast of said intake, and wherein said backing member is buckled across the width thereof.

13. A suction cleaner comprising an open-topped dust receptacle having an air intake for dirt-laden air, a flat filter assembly covering at least part of said receptacle and including a sheet of porous paper and a rigid, perforated backing member for supporting the paper against collapse under suction, means for generating a suction above said filter receptacle, said intake discharging the air contiguous to and along the surface of the paper in a certain direction, said filter assembly having a generally rectangular outline with the length thereof extending in the direction of said travel of air, means for mounting said backing member so that it tends to buckle along the width thereof and snaps into one of two stable positions, means for biasing the backing member to a down-buckled position, said bias being such that under high suction conditions said bias is overcome and said backing member snaps to its up position.

14. The cleaner of claim 13 wherein the edges of said backing member along the width thereof are provided with a flexible gasket extending from said member to the receptacle for sealing purposes.

15. A suction cleaner comprising a generally elongated open-topped dust receptacle having an air intake for dirt-laden air, a filter assembly covering at least part of said receptacle and including a flexible, porous sheet and a rigid, perforated backing member for supporting the sheet against collapse under suction pressure, means for generating a suction above said filter assembly, said intake discharging the dirt-laden air lengthwise of said receptacle and contiguous to and along the surface of said filter, and a plurality of transverse partitions for said receptacle, said partitions extending from the receptacle bottom to a height substantially in line with the bottom of said air blast.

16. The structure of claim 15 wherein means are provided for mounting the filter assembly in a buckled condition so that it may snap in or out with respect to the receptacle interior and whereing means are provided for snapping said backing member from one position to another during cleaning operations.

EDWARD H. YONKERS, Jr.